United States Patent Office 2,740,676
Patented Apr. 3, 1956

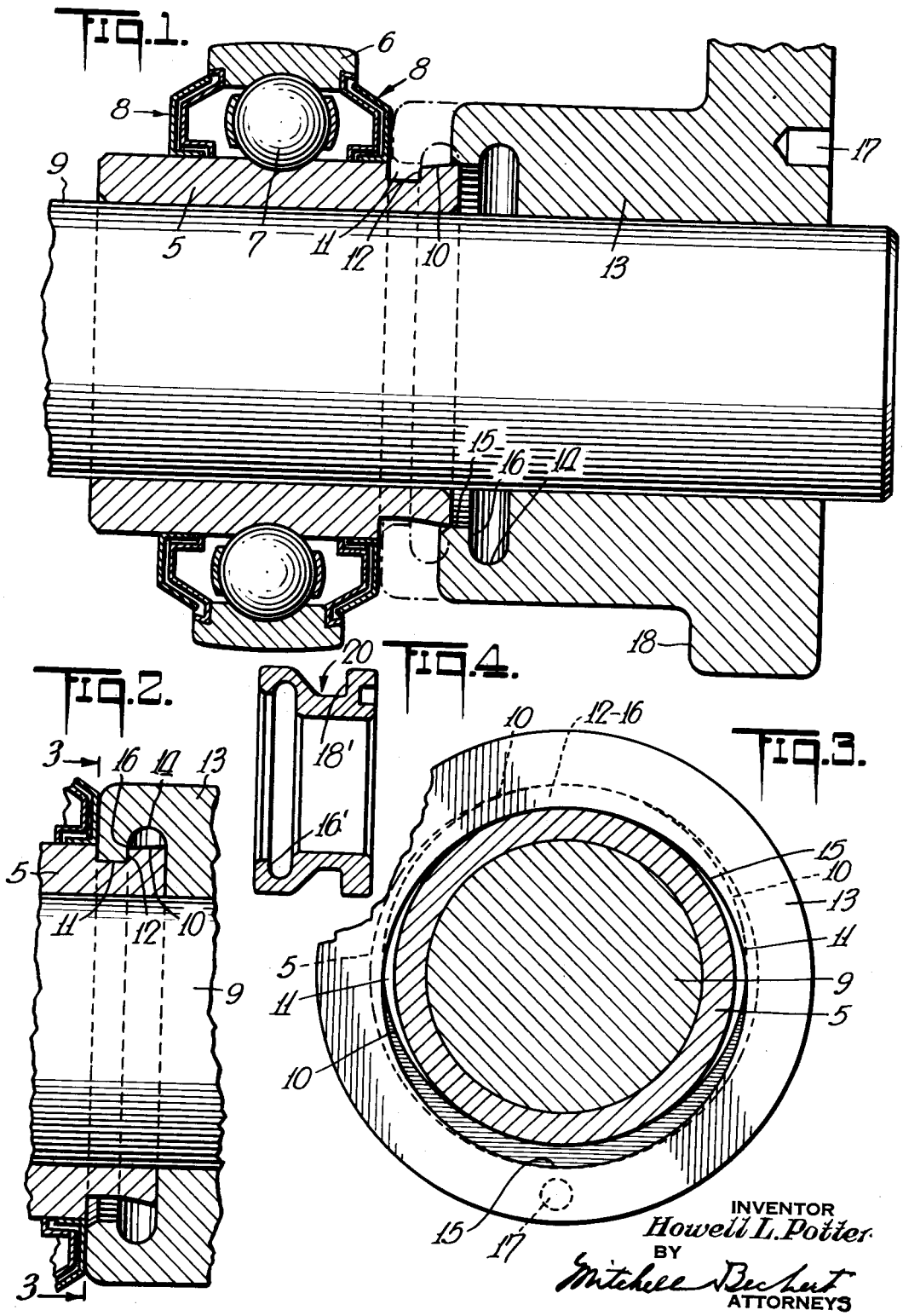

2,740,676
BEARING

Howell L. Potter, New Britain, Conn., assignor to The Fafnir Bearing Company, New Britain, Conn., a corporation of Connecticut Original application May 15, 1952, Serial No. 288,073. Divided and this application April 13, 1953, Serial No. 348,300

4 Claims. (Cl. 308—236)

My invention relates to a bearing, and this application is a division of application Serial No. 288,073, filed May 15, 1952.

Anti-friction bearings are often installed in locations exposed to the elements and, while the bearing members and races themselves are usually lubricant packed and shielded against damage by the elements, the inner rings sometimes rust to a shaft. But whether or not the inner ring rusts on to a shaft, if the bearing is installed in such a position that one side of the inner ring is not accessible, for example, where the bearing extends partly through a wall, it is important to have some means of removing the bearing from the shaft, and my invention relates to a bearing which may be removed by a suitable puller.

It is an object of my invention to provide a bearing with means to facilitate pulling the bearing from a shaft when the inner ring fits the shaft tightly or is rusted thereon.

It is another object to provide an anti-friction bearing with means for coaction with a bearing puller, so that the bearing may be removed from a shaft when it is positioned thereon in such a way that only one side of the bearing is readily accessible.

It is another object to provide a bearing with means for receiving a bearing puller for the ready removal of the bearing from a shaft.

Other objects and various features of novelty and invention will be hereinafter pointed out, or will become apparent to those skilled in the art.

In the drawings which show, for illustrative purposes only, a preferred form of the invention—

Fig. 1 is a side view in vertical central section, through an anti-friction bearing and bearing puller, illustrating the invention;

Fig. 2 is a fragmentary view of the structure shown in Fig. 1 and illustrates the inner bearing ring and bearing puller interlocked for bearing removal;

Fig. 3 is a sectional view taken substantially in the plane of the line 3—3 of Fig. 2;

Fig. 4 is a view on a reduced scale illustrating a slight modification of the bearing puller of Fig. 1.

Briefly stated, my invention, in the preferred forms shown, will be described in connection with an anti-friction bearing having an eccentric locking surface formed on the inner ring, which normally coacts with a corresponding eccentric surface on a locking collar to lock the ring to a shaft. Such bearing holding devices are now in common use and may be said to be substantially the same in function and appearance as devices disclosed in Searles Patent No. 1,561,443, November 10, 1925. The inner ring of such a bearing, as stated, is formed at one end with a cam or locking surface eccentric to the bore. In the preferred form, the puller for removing such an anti-friction bearing from the shaft is provided with an eccentric shoulder or abutment, which may fit an abutment surface on the inner ring, and preferably such abutment surface on the inner ring is formed by concentrically grooving the inner ring circumferentially at an axial location inwardly of the end of the ring and preferably of the eccentric cam section thereon.

In use, after removing the eccentric locking collar, which normally holds the inner ring to the shaft, my improved bearing puller may be slid on the shaft up to the bearing to be removed. If the inner bearing ring has been provided with a generally radially extending abutment surface or shoulder, my improved bearing puller is passed over the eccentric cam surface on the inner ring, and the eccentric puller surface on the bearing puller is positioned over the concentric groove heretofore mentioned. The bearing puller is then given a partial rotation so as to engage the abutment surfaces, after which the bearing puller may be moved axially and pull the inner ring and other bearing parts with it.

In the drawings, the anti-friction bearing illustrated includes an inner ring 5, and an outer ring 6, with interposed anti-friction bearing members such as balls 7. The bearing illustrated has bearing seals 8 for shielding the bearing against the ingress of foreign matter and against loss of lubricant. The inner ring, which is designed to fit snugly on shaft 9, is provided at one end with an eccentric locking cam or surface 10, the high point of such surface 10 being shown at the top in Fig. 1 and the low point of such eccentric surface being shown at the bottom of Fig. 1. This eccentric locking surface 10 would normally coact with the eccentric locking collar heretofore referred to for holding the inner bearing ring and consequently the entire bearing in position on the shaft. We shall assume, in the present case, that the left-hand side of the bearing is not accessible and the bearing inner ring therefore cannot be driven off of the shaft from the left but must be pulled off from the right. In the form illustrated, a groove 11 is formed in the inner ring, and such groove in the bearing shown is located axially inwardly of the cam surface 10, or is actually formed on the axially inner side of the eccentric surface 10. This groove 11 is concentric with the bore of the inner ring 5 and concentric with the shaft 9. It will be seen that the groove 11 provides a generally radially extending crescent-like abutment surface 12 with which my improved bearing puller may be engaged for removing the bearing from the shaft.

My improved bearing puller in the form shown comprises a comparatively heavy sleeve 13, having a bore to slidably fit the shaft 9. The sleeve at the end, adjacent to the bearing, is provided with an internal, annular groove 14, concentric with the shaft and the bore, and the entrance to such circumferential groove 14 is defined by an eccentric bore providing an eccentric lip 15, the eccentricity of which corresponds generally to the eccentricity of the locking or cam surface 10 on the inner ring.

Thus, the eccentric bore 15 forms, with the groove 14, an abutment surface 16 corresponding substantially to the abutment surface 12. The abutment surface 16 is designed to act as the puller surface, as will be described. The sleeve 13 preferably has a small hole or other mark 17, which may indicate the high point of the eccentric entrance bore 15 in the bearing puller 13, so that such high point may be passed over the eccentric high point on the ring cam surface 10 (Fig. 1). Thus, the bearing puller may be passed over the adjacent end of the inner ring into the dotted line position shown in Fig. 1. The bearing puller may then be given a half-turn on the shaft so as to bring the abutment surface on the puller opposite the abutment surface 12 on the ring, as will be clearly seen in Figs. 2 and 3. Thus, the two abutment surfaces 12 and 16 will be in engagement with each other, and the area of such engaging surfaces will be in the form of a narrow crescent which is widest at the top, as shown in Fig. 3, and which tapers off and disappears at about 90° on either side of the high point in Fig. 3. The bearing puller may have a substantial flange or other means providing an abutment surface 18, which may be engaged by any standard pulling device so that the bearing and puller may be removed as a unit along with the shaft. When the bearing and puller have been pulled over the end of the shaft, they may be readily disengaged from each other.

In the form shown in Fig. 4, the interengagement of the abutment 12 on the ring with the corresponding abutment 16' in the bearing puller will be the same as in Figs. 1–3. The bearing puller of Fig. 4, however, is much smaller and lighter than the form already described. The groove 20 in the bearing puller of Fig. 4 provides a radial abutment surface 18' corresponding to the surface 18 on the sleeve 17, and is designed to receive any standard tool which may serve to pull the bearing from the shaft. The rather heavier, larger bearing puller shown in Fig. 1 has some advantages over the smaller form shown in Fig. 4, the principal advantage being that, if the inner ring is rusted on to the shaft, the puller 13 might be reversed in its position and, by sliding it along the shaft rather forcibly, the bearing ring may be hammered and thus loosened from the shaft. After the bearing ring is loosened, the bearing puller may be put on as shown in Fig. 1 and the bearing removed, as has already been described. The smaller puller shown in Fig. 4 could be used in the same way, but, due to its lesser mass, would not be so effective in hammering the inner ring loose.

It will thus be seen that I have provided an improved bearing and a very simple yet effective means for removing the bearing from a shaft in such situations where normal methods of bearing removal would not be effective or convenient.

While the invention has been described in considerable detail and a preferred form shown, it is to be understood that various changes and modifications may be made within the scope of the invention as defined in the appended claims.

I claim:

1. In a device of the character indicated, a bearing ring having a bore to fit a shaft, an eccentric circumferential cam surface at one end of said ring, said ring axially inwardly of said cam surface having a circumferential groove concentric with said bore, the axially outer side of said groove being defined by said eccentric cam surface.

2. In a device of the character indicated, a bearing ring having a bore to fit a shaft, said ring axially inwardly of one end thereof having radially extending shoulder means thereon to serve as an abutment for engagement by a puller means, said ring directly contiguous to said shoulder means being of circumferentially eccentric form.

3. In a device of the character indicated, a bearing comprising inner and outer bearing rings with interposed anti-friction bearing members, said inner ring and said inner ring projecting axially beyond said outer ring, said inner ring at said one end having generally radially extending shoulder means axially outwardly of said outer ring to serve as an abutment for engagement by a ring puller means, said ring axially outwardly of said shoulder means and directly contiguous thereto being of circumferentially eccentric form.

4. In a device of the character indicated, a bearing ring having generally radially extending abutment means adjacent to but axially inwardly of one end thereof to provide abutment surface means for engagement by ring puller means, said ring axially outwardly of said abutment surface means and directly contiguous thereto being of circumferentially eccentric form.

References Cited in the file of this patent

UNITED STATES PATENTS

| | | |
|---|---|---|
| 843,906 | Murchie | Feb. 12, 1907 |
| 1,629,003 | Schonfeld | May 17, 1927 |
| 1,889,064 | Dunham | Nov. 29, 1932 |
| 1,969,426 | Ross | Aug. 7, 1934 |
| 2,001,193 | Hedgecock | May 14, 1935 |
| 2,584,740 | Reynolds | Feb. 5, 1952 |
| 2,679,983 | Happe | June 1, 1954 |